(12) United States Patent
Takeda et al.

(10) Patent No.: US 8,335,037 B2
(45) Date of Patent: Dec. 18, 2012

(54) MILLIMETER WAVE BAND NONRECIPROCAL DEVICE

(75) Inventors: Shigeru Takeda, Kumagaya (JP); Shin-Ichi Ohkoshi, Tokyo (JP)

(73) Assignees: The University of Tokyo, Tokyo (JP); Dowa Electronics Materials Co., Ltd., Tokyo (JP)

( * ) Notice: Subject to any disclaimer, the term of this patent is extended or adjusted under 35 U.S.C. 154(b) by 988 days.

(21) Appl. No.: 12/253,651

(22) Filed: Oct. 17, 2008

(65) Prior Publication Data

US 2009/0261919 A1    Oct. 22, 2009

(30) Foreign Application Priority Data

Oct. 24, 2007  (JP) ................ 2007-300989
Oct. 17, 2008  (JP) ................ 2008-268637

(51) Int. Cl.
*C04B 35/40* (2006.01)
*C04B 35/64* (2006.01)
*C04B 35/26* (2006.01)
*H01F 1/00* (2006.01)
*G02B 5/30* (2006.01)
*G02B 27/28* (2006.01)

(52) U.S. Cl. ............... 359/484.1; 252/62.57; 252/62.58; 252/62.59

(58) Field of Classification Search ..... 252/62.57–62.59
See application file for complete search history.

(56) References Cited

U.S. PATENT DOCUMENTS

| 7,260,281 B2 * | 8/2007 | Salib et al. ............ 385/11 |
| 2007/0218319 A1 * | 9/2007 | Ohkoshi et al. ......... 428/836.1 |
| 2010/0062283 A1 | 3/2010 | Ohkoshi |

FOREIGN PATENT DOCUMENTS

| JP | 2000-191368 A | 7/2000 |
| JP | 2007-269548 A | 10/2007 |

OTHER PUBLICATIONS

Shiro Kuroki, et al., "Control of Spin Reorientation Phenomenon in $\epsilon$-Fe2O3 Nanomagnet", Digest of the 29th Annual Conference on Magnetics in Japan (2005), 21PPS-16.
Sakurai et al., "Large Coercive Field and Spin Reorientation Phenomenon in $\epsilon$-Fe2O3 Nanorod" Digest of the 29th Annual Conference on Magnetics in Japan (2005), 21pPS-17.
Sakurai et al., "Preparation of Magnetically Oriented $\epsilon$-Fe2O3 Nanoparticles Exhibiting Large Coercive Field" Digest of the 30th Annual Conference on Magnetics in Japan (2006), 13pD-3.
Ohkoshi, "Synthesis and Magnetic Properties of a Nanorod of Iron Oxide" Ceramics, vol. 41, No. 4, pp. 296-299 (2006).
Japanese Office Action, and English translation thereof, issued in Japanese Patent Application No. 2008-268637 dated Sep. 12, 2012.

* cited by examiner

*Primary Examiner* — Carol M Koslow
*Assistant Examiner* — Matthew Hoban
(74) *Attorney, Agent, or Firm* — McDermott Will & Emery LLP (57) ABSTRACT

[Problem] When a nonreciprocal device operating at 100 GHz to 300 GHz is to be realized by using a conventional magnetic material of garnet-type ferrite or spinel-type ferrite, a huge permanent magnet is required and, therefore, it is very difficult to achieve a millimeter-wave band nonreciprocal device for practical use.
[Solving means] To solve this problem, there is provided a millimeter-wave band nonreciprocal device composed of a magnetic material represented by a formula $\epsilon\text{-}M_xFe_{2-x}O_3$ (0<x<2), wherein M is at least one of elements In, Ga, Al, Sc, Cr, Sm, Yb, Ce, Ru, Rh, Ti, Co, Ni, Mn, Zn, Zr, and Y and the magnetic material having $\epsilon$-phase hematite as a principal phase exhibits strong coercive force and anisotropic magnetic field at room temperature. Dimensions of a magnetic circuit containing a permanent magnet for operations of the nonreciprocal device can be made remarkably small and, by optimum design, the use of the magnetic circuit can be made unnecessary.

9 Claims, 9 Drawing Sheets

MILLIMETER WAVE BAND NONRECIPROCAL DEVICE

TECHNICAL FIELD

The present invention relates to a magnetic device to be used in a millimeter-wave frequency band between 30 GHz and 300 GHz.

BACKGROUND ART

Electromagnetic (EM) waves in the millimeter-wave band (30-300 GHz) are being studied increasingly for applications to a high-speed wireless LAN (Local Area Network), radar for the prevention of vehicle collisions, or the like. Frequencies of 35, 94, and 140 GHz in particular are those of so-called "window of the air" and Electromagnetic waves at these frequencies have high transparency in the air and, therefore, the millimeter-wave band can be suitably used for the wireless LAN, radar, or the like. Moreover, when the millimeter-wave band is put to practical use, even in the case of such millimeter-wave band, EMC (Electromagnetic compatibility) problems cannot be avoided and there is no doubt that, as a countermeasure against the EMC problem, a device such as a wave absorber and nonreciprocal device is required. However, a magnetic material capable of effectively suppressing the EMC problem in the millimeter-wave band has been not yet reported to date. Conventionally, as a nonreciprocal device for countermeasures against the EMC problem, a garnet-type ferrite or spinel-type ferrite nonreciprocal device has been widely used. However, if such magnetic materials as above are used in the millimeter-wave band, a very large permanent magnet for magnetization is indispensable, which causes a magnetic circuit to be made large in size and, as a result, a problem related to practical usability has arisen in terms of the achievement of the miniaturization of the nonreciprocal device to be used.

In such a circumstance, the development of excellent magnetic materials usable for the countermeasure against the EMC problem is attracting attention. Particularly, the advent of a magnetic material having high coercivity and exhibiting high resonance frequency is expected. To meet such a demand, $\epsilon$-$Fe_2O_3$ ($\epsilon$-phase hematite) in the form of a single-phase nanoparticle being 100 nm in size has been produced in recent years. The nanoparticle has a characteristic of having high coercivity at room temperature.

Two kinds of substances with the chemical formula of $Fe_2O_3$ are known, one being $\gamma$-phase hematite and another being $\alpha$-phase hematite. As an intermediate substance between the above two substances, $\epsilon$-phase hematite had been earlier reported, however, it had been reported that the substance was intermediate phase hematite and there was no report until lately that the substance was obtained as a single phase hematite. The reason is that the $\epsilon$-phase hematite is in a metastable phase and exists only under special conditions. Recently, one of the inventors of the present invention found that the single nanoparticle could be produced in a stable state by a method obtained by combining a reverse micelle method and a sol-gel method and disclosed the finding in Non-Patent References 1 to 4

Non-Patent Reference 1: Kuroki, Sakurai, Hashimoto, and Ohkoshi; "Control of spin reorientation phenomenon in $\epsilon$-$Fe_2O_3$ nanomagnet" Digest of the 29$^{th}$ Annual Conference on Magnetics in Japan [2005], 21 pPS-16.

Non-Patent Reference 2: Sakurai, Oda, Nuida, Hashimoto, and Ohkosi; "Large coercive field and spin reorientation phenomenon in $\epsilon$-$Fe_2O_3$ nanorod" Digest of the 29$^{th}$ Annual Conference on Magnetics in Japan [2005], 21 pPS-17.

Non-Patent Reference 3: Sakurai, Shimoyama, Hashimoto and Ohkoshi; "Preparation of magnetically oriented $\epsilon$-$Fe_2O_3$ nanoparticles exhibiting large coercive field" Digest of the 30$^{th}$ Annual Conference on Magnetics in Japan [2006], 13 pD-3.

Non-Patent Reference 4: Ohkoshi; "Oxide nanoparticle", Ceramics 41 [2006] No. 4, pp. 296-299.

DISCLOSURE OF THE INVENTION

Problems to be Solved by the Invention

Thus, the conventional technology has a problem in that, when the nonreciprocal device capable of solving the EMC problem in the millimeter-wave band is to be realized, in the case of using the conventional magnetic substance, an additional support by using a strong permanent magnet is required, which causes dimensions of the entire nonreciprocal device to become large or the device to be too huge to realize the device itself. Here, to solve these problems, the present invention provides a millimeter-wave band nonreciprocal device having a compact configuration by using a magnetic substance that can provide natural resonance absorption effective in a millimeter-wave band.

Means for Solving the Problem

The inventors of the present invention have redoubly studied the possibility of solving technological problems described above by using, as a material for the nonreciprocal device, the magnetic material which has $\epsilon$-$Fe_2O_3$ ($\epsilon$-phase hematite) as a skeleton and is obtained by substituting part of Fe elements with other element to exhibit nonreciprocal property in a short wave length region and by using the magnetic material as the nonreciprocal device to complete the present invention.

In such a background of the conventional technology, the millimeter-wave band nonreciprocal device of the present invention is characterized by including, as a main component, a magnetic material represented by a formula $\epsilon$-$M_xFe_{2-x}O_3$ (0<x<2), wherein M is at least one of elements In, Ga, Al, Sc, Cr, Sm, Yb, Ce, Ru, Rh, Ti, Co, Ni, Mn, Zn, Zr, and Y.

Also, the millimeter-wave band nonreciprocal device of the present invention is characterized in that a magnetization easy axis of the magnetic material is oriented in one direction.

Also, the millimeter-wave band nonreciprocal device of the present invention is characterized in that the magnetic material is composed of particles and a magnetization easy axis of each of the particles is oriented in one direction.

Moreover, the millimeter-wave band nonreciprocal device of the present invention is characterized by being any one of a Faraday rotation type isolator, wave-guide type resonance absorption isolator, wave-guide type Y-junction circulator, wave-guide type field-displacement isolator, strip-line type three branched circulator, and strip-line type edge-guide mode isolator.

EFFECTS OF THE INVENTION

It is made possible to solve, by using the miniaturized nonreciprocal device of the present invention as a simple and low-cost method, the EMC problems occurring in wireless LAN systems, various kinds of radar systems, and sensor systems that operate in the millimeter-wave band.

BEST MODE FOR CARRYING OUT THE INVENTION

The present invention is described by reference literatures and drawings. Out of the conventional materials represented by the chemical formula of $Fe_2O_3$ described above, the γ-phase hematite is of an inverse-spinel structure containing an empty lattice point, the α-phase hematite is of a hexagonal crystalline structure, and the ε-phase hematite constituting the skeleton of the magnetic material of the present invention is of a slightly-distorted orthorhombic crystalline structure. Therefore, the ε-phase hematite exhibits high magnetocrystalline anisotropy ($K > 2 \times 10^6$ erg/cc) and its spontaneous magnetization is comparatively low (Ms=15 emu/g) and, as a result, the occurrence of a large anisotropy field (Ha=2K/Ms) is expected. Moreover, the nanoparticle of the ε-phase hematite is as small as 100 nm in size and, in the nanoparticle, a single magnetic domain is formed which enables the nanoparticle to exhibit coercivity (Hc) being near to the anisotropy field that the magnetic substance originally has.

Furthermore, in the crystalline structure of the ε-phase hematite, there exist four sites A, B, C, and D which Fe ion enters and, when part of Fe elements are substituted by other element, an ion of the other element tends to enter the D site preferentially, thus enabling the control of spontaneous magnetization.

Generally, when an Electromagnetic wave with a frequency of $f=(\gamma Ha)/(2\pi)$, where γ represents a gyromagnetic constant being 2.8 MHz/Oe, is applied to a ferromagnetic substance having an anisotropy field Ha, natural resonance being one of ferromagnetic resonance absorption phenomena occurs at the frequency. Since the anisotropy field (Ha) of the ε-phase hematite is large, it is expected that the natural resonance occurs in the frequency band exceeding 100 GHz band.

Incidentally, the ε-$Fe_2O_3$ having the properties described above can be produced by the method obtained by combining the reverse micelle method and sol-gel method. More specifically, a material solution is first prepared by dissolving iron nitrate (III) and surfactant (for example, cetyltrimethylammonia) in an aqueous phase of a solution containing n-octane as an oil phase.

Also, as a shape control agent, an appropriate amount of nitrate of alkaline earth elements (Ba, Sr, Ca or the like) may be dissolved in the aqueous phase of the material solution. By adding the shape control agent, the production of a rod-shaped single-phase ε-$Fe_2O_3$ particle is made possible.

Further, besides the preparation of the material solution, a solution of a neutralizer is prepared by mixing a micelle solution obtained by dissolving a surfactant in the solution containing n-octane as the oil phase with a neutralizer such as an aqueous solution of ammonia.

Next, a mixed solution is prepared by mixing the material solution with the solution of the neutralizer while these solutions are being stirred using the reverse micelle method so that the precipitation reaction of an iron hydroxide compound particle is made to progress in the mixed solution.

Then, coating with silica is performed on the surface of the iron hydroxide compound particle having a rod-like shape or other shape by the sol-gel method, that is, by adding, as necessary, the solution of a silane compound to the mixed solution.

The above reactions occur in the mixed solution in which hydrolysis occurs on the surface of a nano-order fine iron hydroxide compound particle, thereby producing the iron hydroxide compound particle (hereinafter, called a "silica-coated iron hydroxide compound particle") on the surface of which the silica coating is performed.

Next, the silica-coated iron hydroxide compound particle is separated from the mixed solution and, then, baking treatment is performed thereon in an atmosphere of air at a predetermined temperature (in the range of 700-1300° C.). This baking treatment induces the oxidation reaction in a silica shell of the silica-coated iron hydroxide compound particle, thus producing a fine ε-$Fe_2O_3$ particle.

Figure 1:
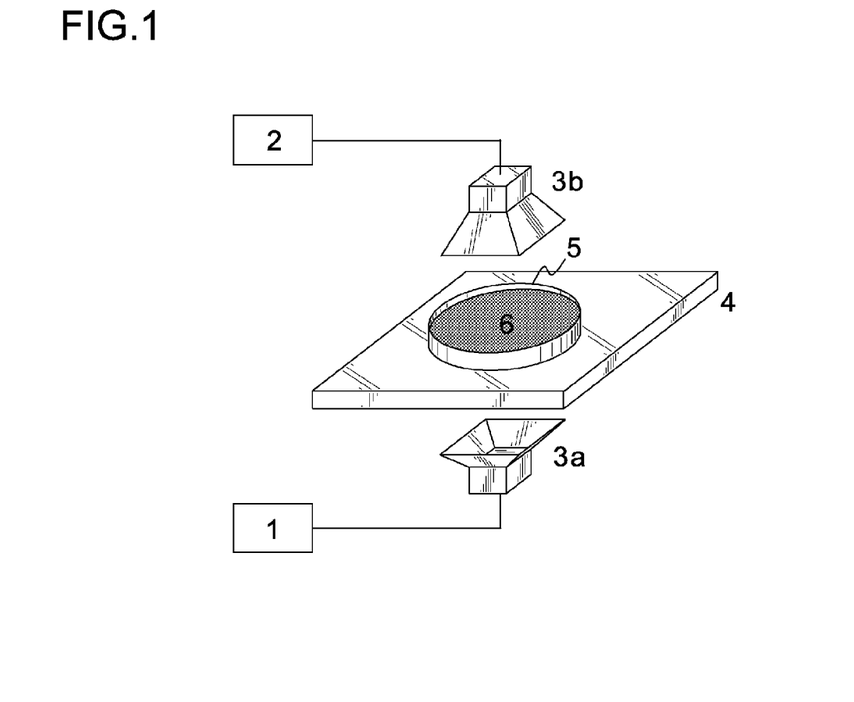
FIG. 1 is a diagram schematically showing a measurement device to measure properties of a new material constituting a basic feature of the present invention.

In order to confirm that the natural resonance occurs at the frequency band exceeding 100 GHz, an Electromagnetic wave absorption experiment was performed on the ε-phase hematite using the measurement system as shown in FIG. 1. The reference No. 1 shows a millimeter-wave band signal source which can sweep from 96 GHz to 142 GHz. The reference No. 2 shows a millimeter-wave signal detector. The reference No. 3a shows a transmitting horn antenna and No. 3b shows a receiving horn antenna. The reference No. 4 shows a sample container securing base to hold a sample, No. 5 shows a sample container to house a sample and No. 6 shows a powder sample. The diameter of the container is about 52 mm and the thickness of a filled sample is about 5 mm. The container is filled with the sample in a manner in which powder is naturally overlaid and, therefore, the powder is formed without the application of special pressure. A signal is first detected without the powder and then the sample container is made to be filled with the powder to measure an amount of attenuation in decibels (dB).

Here, at the time of producing the material solution in the process described above, by dissolving M, (M is an element other than Fe and 0<x<2) approximately in the material solution, a single phase ε-$M_xFe_{2-x}O_3$ resulting from partial substitution of $Fe^{3+}$ ion site, though having the same crystalline structure as the ε-$Fe_2O_3$, can be produced. As the M, the element having a valence of 3 is preferably used. More specifically, the M can be one element selected from elements In, Ga, Al, Sc, Cr, Sm, Yb, Ce, Ru, Rh, Ti, Co, Ni, Mn, Zn, Zr, and Y.

Figure 2:
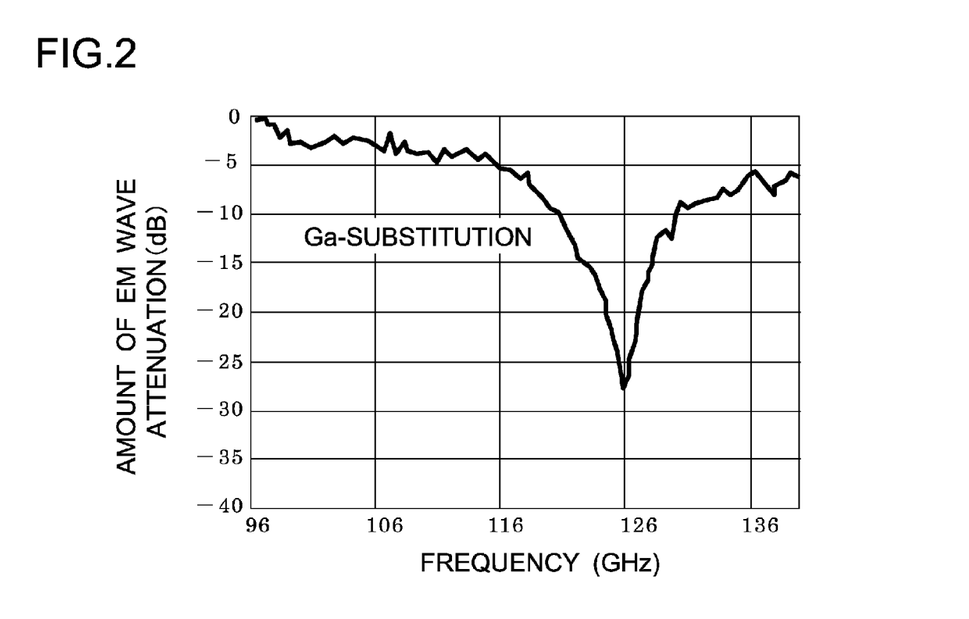
FIG. 2 is a diagram showing properties of the material constituting the basic feature of the present invention.

FIG. 2 is a graph showing a measurement result of an amount of Electromagnetic wave attenuation of Ga-substituted ε-phase hematite ($Ga_xFe_{2-x}O_3$; x=0.15). It was confirmed that natural magnetic resonance in the Ga-substituted ε-phase hematite occurs at the frequency of 126 GHz.

Figure 3:
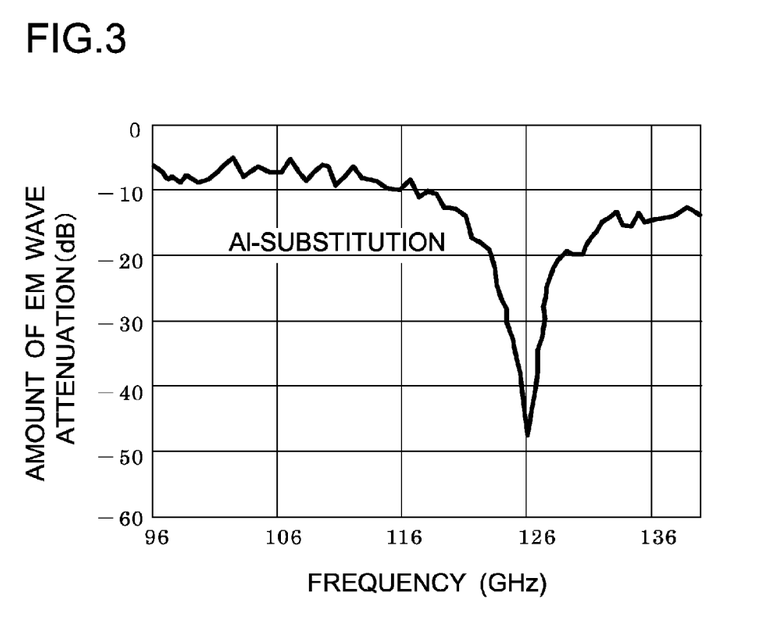
FIG. 3 is also a diagram showing properties of the another material constituting the basic feature of the present invention.

FIG. 3 is a graph also showing a measurement result of an amount of Electromagnetic wave attenuation of Al-substituted ε-phase hematite ($Al_xFe_{2-x}O_3$; x=0.15). The natural magnetic resonance in the Al-substituted ε-phase hematite occurs also at the frequency of 126 GHz.

Thus, by substitution by various elements, the natural resonance frequency in the 100 GHz can be shifted. This shift can be made to occur by changing a kind of an element to be used for the substitution or by changing a substitution amount using the same element. The reason for the shift of the natural resonance frequency by the substitution by other elements is that a crystal anisotropy constant K does not vary mainly due to the crystalline structure of the material and spontaneous magnetization Ms changes. In the case of the substitution applied in a non-magnetic substance, the occurrence of the spontaneous magnetization increases which causes the natural resonance frequencies to be shifted toward a low frequency side.

In the case of the material having the chemical formula of $M_xFe_{2-x}O_3$, in the example of the present invention, the M is substituted by Ga and Al only, however, elements such as In, Sc, Cr, Sm, Yb, Ce, Ru, Rh, Ti, Co, Ni, Mn, Zn, Zr, and Y can be used for the substitution. These elements can be used in a state where any one of the elements is singly used for the substitution or combinations of these elements are used in a combined manner.

Since the measurement results in FIGS. 2 and 3 show characteristics of the powder indiscriminately overlaid, the result from the measurement can be applied to a wave absorber in the millimeter waves. However, these materials are a nano-sized single crystal every particle of which has an axis of easy magnetization and is of a single magnetic domain structure and, therefore, by producing a bulk-like solid material with the single crystal aligned in one direction, a range of applications of the material can be expanded. Here, the easy magnetization axis represents an easily magnetizable crystal direction in a magnetic substance exhibiting magnetocrystalline anisotropy by which a magnetic property of a substance, that is, stability of magnetization of the substance in particular varies depending on a crystal direction.

Figure 4:
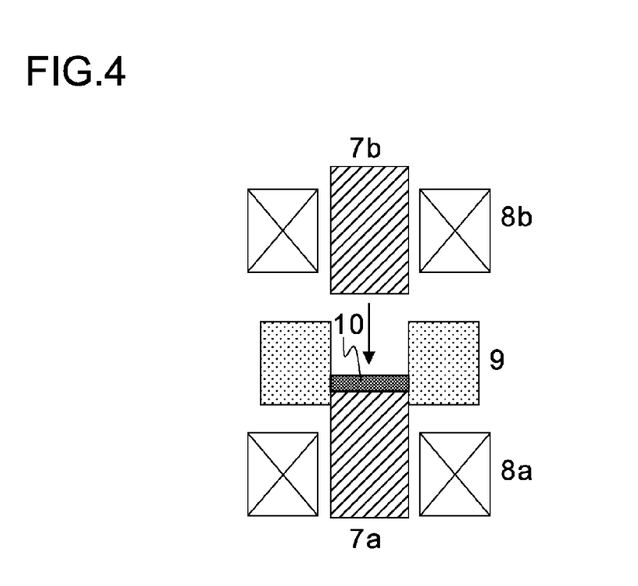
FIG. 4 is a diagram schematically showing a cross-section of a forming device for a new orientated material.

FIG. 4 is a schematic cross-sectional view of a in-magnetic-filed forming device to produce a nano-sized solid material having aligned easy magnetization axis directions. The reference No. 7a shows a lower punch, 7b shows an upper punch, 8a shows a lower solenoid coil and 8b shows an upper solenoid coil. The reference No. 9 shows a non-magnetic dies. The sample 10 obtained by mixing nanoparticles 11 with binders 12 is put into the dies 9 and is compressed by the upper punch 7b from the direction of the arrow in FIG. 4 while being exposed in the magnetic field generated by currents applied to the solenoid coils 8a and 8b. Each of the nanoparticles 11 composing the powder is compressed with being orientated by the magnetic field and is solidified by the binders 12 and, therefore, can be taken out as a solid material from the dies 3.

Figure 5A:
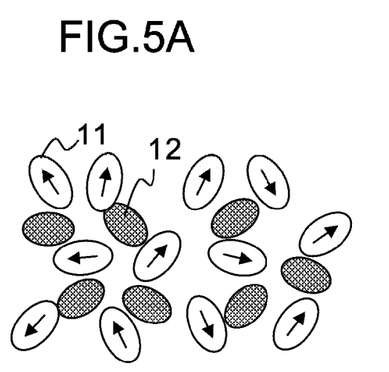
FIGS. 5(a) and 5(b) are diagrams schematically showing a structure of the new orientated material according to an example of the present invention.
Figure 5B:
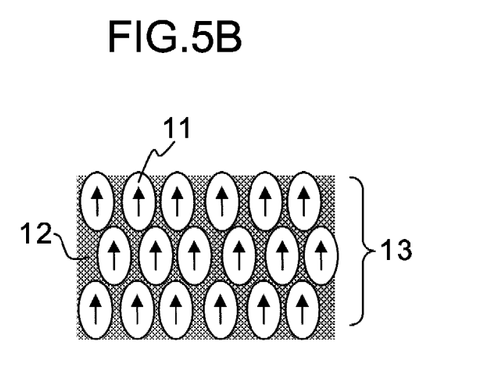
Figure 6:
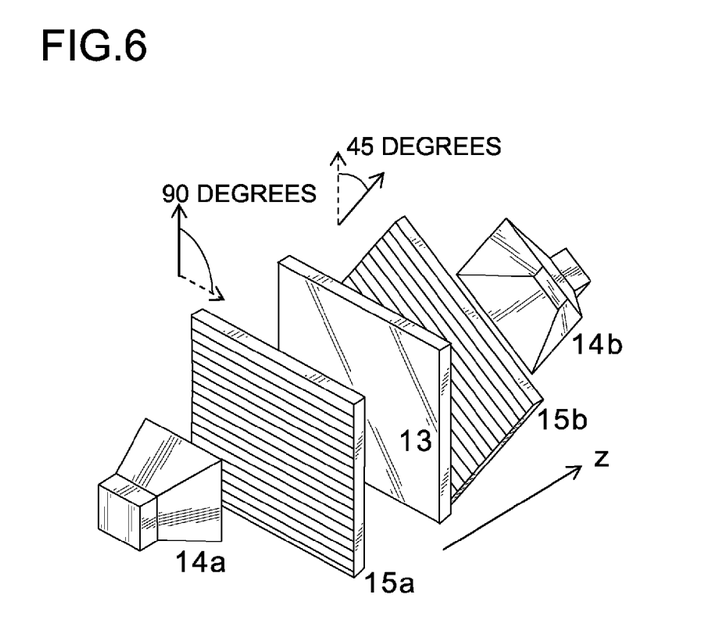
FIG. 6 is a diagram schematically showing the structure of the nonreciprocal device according to the example of the present invention.

FIG. 5(a) shows a state in which the nanoparticles 11 of the ε-phase hematite and the binders 12 are put into the dies 9 with being indiscriminating mixed and FIG. 5(b) shows a state of an orientated composite magnetic substance 13 formed in the magnetic field by using the forming device shown in FIG. 4. The easy magnetization axis direction and magnetization direction of the nanoparticles 11 are aligned in the direction of the magnetic field and clearances among the nanoparticles 11 are occupied by the binders 12. The binder 12 is to be selected which is liquid and has good flowability while the forming process proceeds and which is in a state solidified by pressure and heat treatment and restrains the rotation of the nanoparticles 11 after the formation. If the nanoparticles 11 are left in a state where the restraint is not sufficient, magnetostatic energy is made to be lowered, causing the nanoparticles 11 to be partially rotated inversely and resulting in the degradation of characteristics of the millimeter-wave band nonreciprocal device using the above composite magnetic substance 13 of the present invention. The binder 12 plays a role in maintaining the orientated state of the nanoparticle 11 in a manner to be stable against changes in temperature, humidity, surrounding gas atmospheres. Since the coercivity of the ε-phase hematite constituting the composite substance described above is very high, the composite substance is magnetized in one direction, thus causing the natural resonance phenomenon to have a direction-dependent property. That is, as shown in FIG. 6, the plate-shaped composite substance 13 composed of the magnetic material of the ε-phase hematite magnetized in the direction of plate thickness is inserted between the inputting horn antenna 14a and outputting horn antenna 14b so that the direction of the magnetization is almost parallel to the direction of propagation of the Electromagnetic wave. A polarizer 15a for the formation of linearly polarized waves is attached to the inputting horn antenna 14a in a secured manner. The polarizer 15a is a bamboo blind shaped conductive filter which absorbs waves having an electric field in the longitudinal direction of the bamboo blind and makes waves in a direction orthogonal to the longitudinal direction pass through the filter. The longitudinal direction of the bamboo blind shaped conductor serving as the polarizer 15a is orthogonal to the electric field of the inputting horn antenna and waves inputted into the polarizer 15a can be transmitted with almost no loss. On the other hand, similarly, a bamboo blind filter serving as an analyzer is also attached to the outputting horn antenna 14b. The analyzer 15b is secured to the outputting horn antenna 14b and rotates in the same way as the outputting antenna 14b. The bamboo blind conductor is orthogonal to an electric direction of the outputting horn antenna 14b and waves having passed through the bamboo blind conductor can be received by the outputting horn antenna 14b with almost no loss.

Now, in the arrangement of the components shown in FIG. 6, the wave emitted from the inputting horn antenna 14a passes through the polarizer 15a as a linearly polarized wave and enters the composite magnetic substance composed of the orientated nanoparticles of the ε-phase hematite and, at this time point, the composite substance 13 is magnetized in one direction and, therefore, the rotation of the plane of polarization of a linearly polarized wave occurs. The so-called Faraday effect appears. The Faraday's rotation angle $\theta$ is represented by the equation $\theta=Ct$ (where "C" denotes the Faraday constant and "t" denotes the sample thickness), that is, the rotation angle is proportional to the sample thickness. Now, in the arrangement shown in FIG. 6, by setting the sample thickness "t" so that $\theta=45$ degrees and by inclining the analyzer 15b by 45 degrees in the same direction, the wave is transmitted smoothly from an input side to an output side. On the other hand, a wave entered from the outputting side due to some reasons is rotated further 45 degrees by the magnetized composite substance 13 and, when the rotated wave again enters the inputting side, the bamboo blind shape conductor serving as the polarizer 15a becomes parallel to the electric field of the wave and, therefore, the wave is absorbed by the polarizer 15a and does not return back to the inputting side. Thus, the so-called Faraday rotation type isolator can be realized.

The Faraday rotation type isolator as described above can be possibly an indispensable device as a countermeasure against the EMC problem in the wireless LAN or various radars used in the millimeter-wave band. This is a main point of the present invention. The isolator propagates waves from the inputting side to the outputting side, however, does not propagate waves from the outputting side to the inputting side and is, therefore, called a noreturn valve of waves and also a nonreciproval device. The Faraday constant is a function of a frequency. A device is operated ordinarily at a frequency being lower than a natural resonance frequency. The reason for the phenomenon of the rotation of the plane of polarization is that, the linearly polarized wave is divided into a clockwise circularly polarized wave and a counterclockwise circularly polarized wave, the propagation speed of each of the waves differs depending on the effect of the natural resonance phenomenon of a magnetic material. As the frequency of a wave comes near to the natural resonance frequency, the Faraday constant C becomes the larger, however, the loss also increases and, therefore, it is necessary to select a proper operating frequency.

Figure 7:
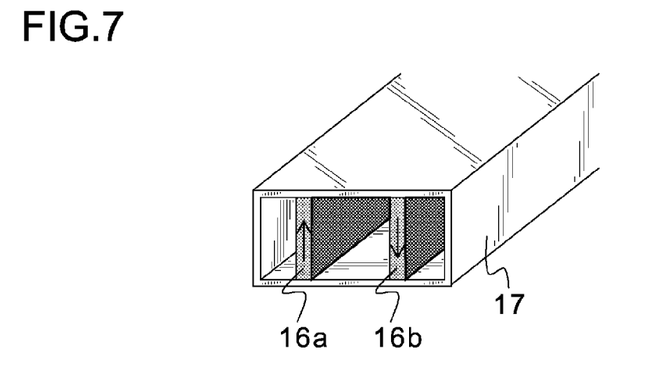
FIG. 7 is also a diagram schematically showing the structure of the nonreciprocal device according to the example of the present invention.
Figure 8:
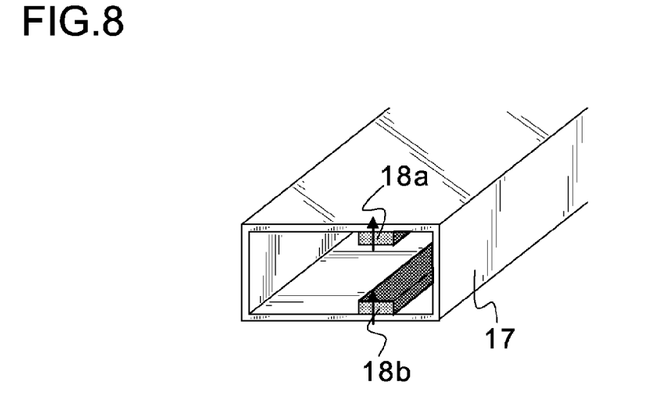
FIG. 8 is a diagram schematically showing the structure of the nonreciprocal device according to the example of the present invention.

Besides the millimeter-wave band nonreciprocal device described above, a wave-guide type resonance absorption isolator as shown in FIGS. 7 and 8 is available. In this case, as shown in FIGS. 7 and 8, each of the composite substances 16a, 16b, 18a, and 18b magnetized in the arrow direction is positioned in a place occupying about ¼ of the longitudinal length of the rectangular wave guide. In this place, circular polarization occurs when waves are propagated. When the direction in which waves travel is reversed, the direction of the rotation of the circular polarization in this place is reversed. The operating frequency to be used in this case is set at the natural resonance frequency itself. By operating as above, the oscillating rotation for magnetization of each of the orientated composite substances 16a, 16b, 18a, and 18b occurs in only one direction and, therefore, waves rotating only in one direction are absorbed. That is, the isolator which absorbs waves propagating only in one direction and does not absorb waves propagating in the reverse direction can be realized. This type of isolator is called a resonance absorption type isolator since only the absorption characteristic of ferromagnetic resonance can be utilized. The orientated ε-phase hematite composite material of the present invention developed newly can be applied to the isolator as described above.

Figure 9:
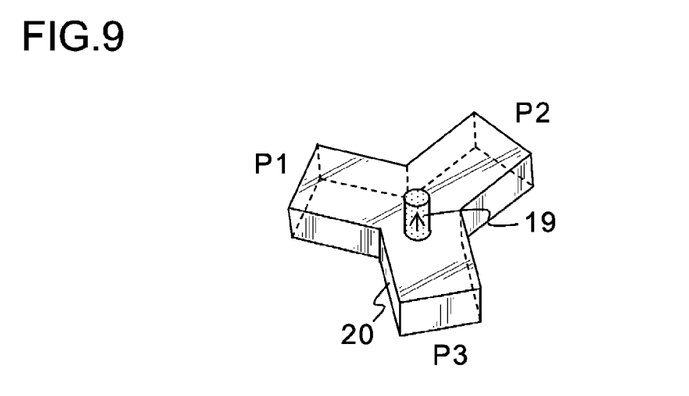
FIG. 9 is a diagram schematically showing the structure of the nonreciprocal device according to the example of the present invention.

FIG. 9 shows an example where the composite magnetic substance 19 composed of the orientated ε-phase hematite is placed at the center of a three-branched rectangular wave guide 20 in a state where its magnetization direction is set to be vertical to a branched face. The device of this type is generally called a wave-guide Y-junction circulator. Its operating principle is that waves entered from the port P1 are transferred to the port 2 but not to the port P3. Similarly, waves entered from the port P2 are transferred to the port P3 but not to the port P1. Waves entered from the port P3 are transferred to the port P1 but not to the port P2. That is, waves are propagated only in one rotating direction and not in a reversed rotating direction. The device as described above is called a circulator. The device as described above can be changed, by connecting an absorber to the port P3, to the isolator in which waves are propagated from the port P1 to the port P2, however, the waves are not propagated to a reversed direction.

Besides the above devices, a nonreciprocal device being operated at a frequency exceeding a natural resonance frequency is available. This is called a field-displacement isolator. Other millimeter-wave band nonreciprocal devices include a strip-line type three branched circulator, strip-line type edge-guide mode isolator, or the like.

It is easily understood by those skilled in the art that the magnetic material containing ε-phase hematite as a principal crystalline phase of the present invention can be applied to the devices as described above.

Thus, the example of the millimeter-wave band nonreciprocal device using the composite magnetic substance composed of the magnetic material containing the ε-phase hematite as a principal crystalline phase is described by referring to the drawings. This reciprocal device differs from the conventional device in that the device as described above can be realized without the existence of a permanent magnet. For example, when a nonreciprocal device operating at 100 GHz is to be realized by the conventional technology using the garnet-type ferrite or spinel-type ferrite, a magnetic field of about 30,000 Oe is required. If the device as described above is to be obtained by using a permanent magnet, it is easily understood by those skilled in the art that a huge magnetic circuit is necessary. Unlike the conventional technology, by using the technology in which the magnetic substance containing the ε-phase hematite as the principal phase being the main point of the present invention is applied to the millimeter-wave band nonreciprocal device, such a huge magnetic circuit is not required or a very small magnet circuit may be used. The measurement results shown in FIGS. 2 and 3 predict the above achievement.

EXAMPLE

Hereinafter, the example of the present invention is described. A pellet with the diameter of 52 mm and the thickness of filled sample of about 5 mm was made out of the magnetic material obtained by the method described above by using the in-magnet-field forming device. A magnetized sample was used which was obtained by vertically applying a pulse magnetic field of about 6 tesla to a pellet surface of ε-$Ga_{0.4}Fe_{1.6}O_3$ produced as above. Its surface magnetic field caused by residual magnetization is about 40 gauss.

Transmitted waveforms were measured by a terahertz wave time region spectroscopy in which a vertically polarized terahertz wave is vertically applied to the sample magnetized by the method described above. In the experiment described below, an influence caused by the residual magnetization without an external magnetization was checked.

Figure 10:
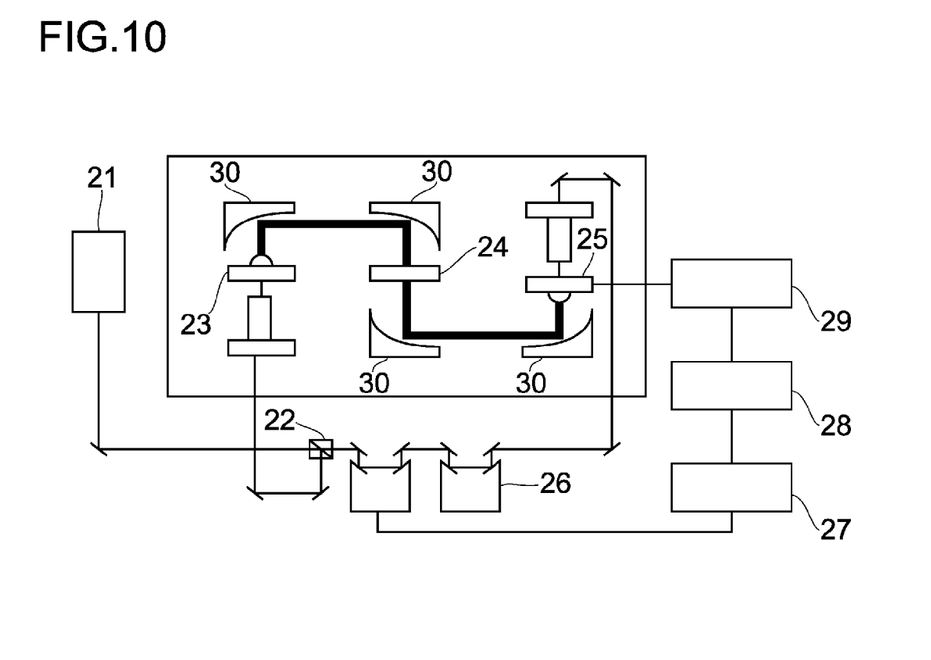
FIG. 10 is a measurement device used in the example of the present invention.

Here, the terahertz wave time region spectroscopy is explained by referring to the measurement device shown in FIG. 10. The laser light generated by the femto-second laser of device 21 is divided into two portions by the beam splitter 22. One of the divided two portions is guided into the terahertz wave generator 23 (made up of an optically conductive switching element having Si lens and GaAs substrate) which then generates a terahertz wave. The generated terahertz wave is guided by a parabolic mirror 30 to the terahertz wave detector 25 (made up of an optically conductive switching element).

The other of the laser ray divided by the beam splitter 22 into two portions is guided, after passing through the time delay circuit 26, to the terahertz wave detector 25. As a result, in the terahertz detector 25, time waveform of an electric field amplitude of the terahertz wave is observed by using the waveform of the laser ray not having passed through the sample container 24 as a reference waveform and the waveform of the terahertz wave having passed through the sample container 24 as a signal waveform. The result from the observation is input, after the passage through the current amplifier 29, into the lock-in amplifier 28. The lock-in amplifier 28 and the time delay circuit 26 are connected to the workstation 27 and the ratio ($S_{sig}/S_{ref}$) of the Fourier-transform spectra ($S_{ref}$ and $S_{sig}$ respectively) of the signal waveform of the terahertz wave to the time waveform of the electric field amplitude of the terahertz wave is calculated to determine an Electromagnetic wave absorption rate of the sample placed in the sample container 24.

Figure 11:
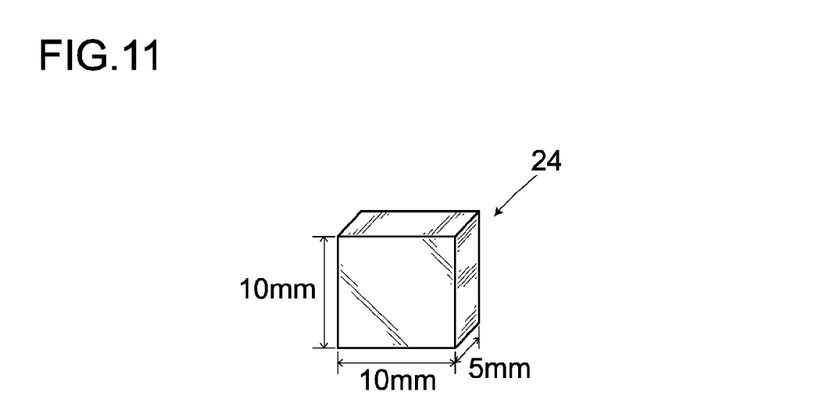
FIG. 11 is a diagram schematically showing a sample container for the measurement device used in the example of the present invention.

Moreover, as shown in FIG. 11, the sample container is a paper box of the size 10 mm×10 mm×5 mm. In the example of the present invention, the sample is placed in the sample container 24. The terahertz wave enters one face of the size 10 mm×10 mm of the sample container 24 and goes out, as a transmitted wave, from another face of the size 10 mm×10 mm.

Figure 12A:
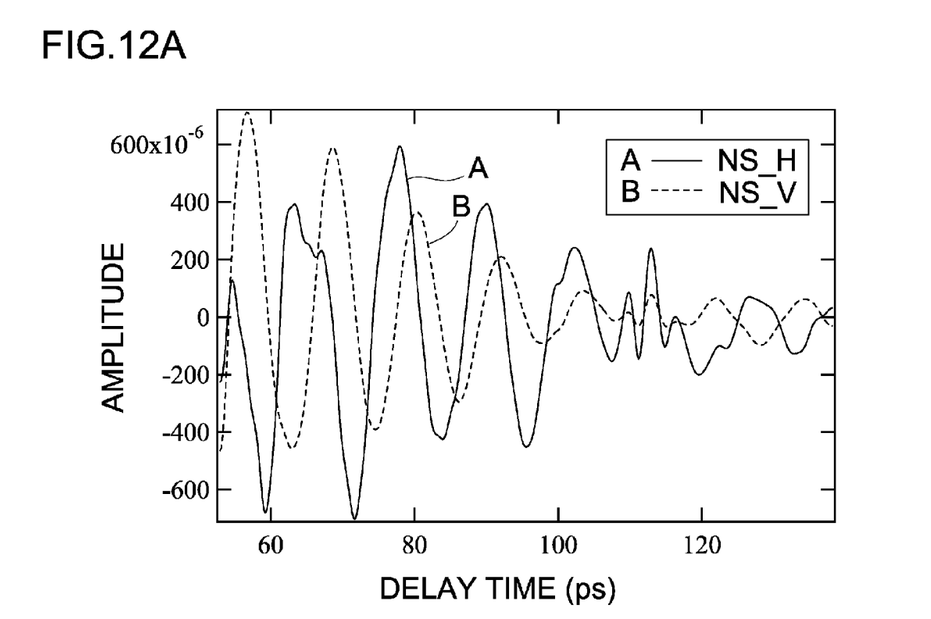
FIGS. 12(a) and 12(b) show time dependence of a transmitted wave measured in the example of the present invention and FIG. 12(a) shows the case where a wave enters from the N pole and 12(b) shows the case where the wave enters from the S pole.
Figure 12B:
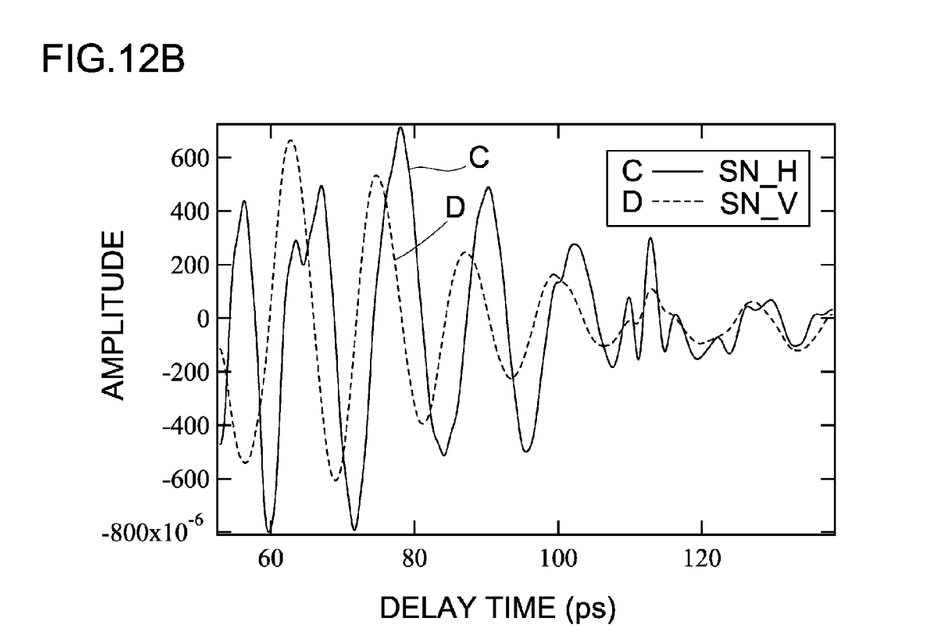

FIG. 12 shows time dependence of the amplitude of the measured transmitted wave. Here, "H" represents horizontal polarization and "V" represents vertical polarization. Moreover, "NS" represents the case where the terahertz wave enters from the N pole face of the sample and "SN" represents the case where the terahertz wave enters from the S pole face of the sample. That is, in FIG. 12(a), A (NS-H) represents horizontal polarization occurring when the terahertz wave enters from the N pole face of the sample. In FIG. 12(b), D (SN-V) represents vertical polarization occurring when the terahertz wave enters from the S pole face of the sample. In the experiment, the horizontally polarized terahertz wave is made to enter vertically, however, when the case in FIG. 12(a) is compared with the case in FIG. 12(b) (that is, the pole of the sample is replaced with the S pole of the sample), phases of the outputted horizontally polarized waves (A and C) are the same. In contrast, the outputted vertically polarized waves (B and D) are 90 degrees out of phase.

Figure 13:
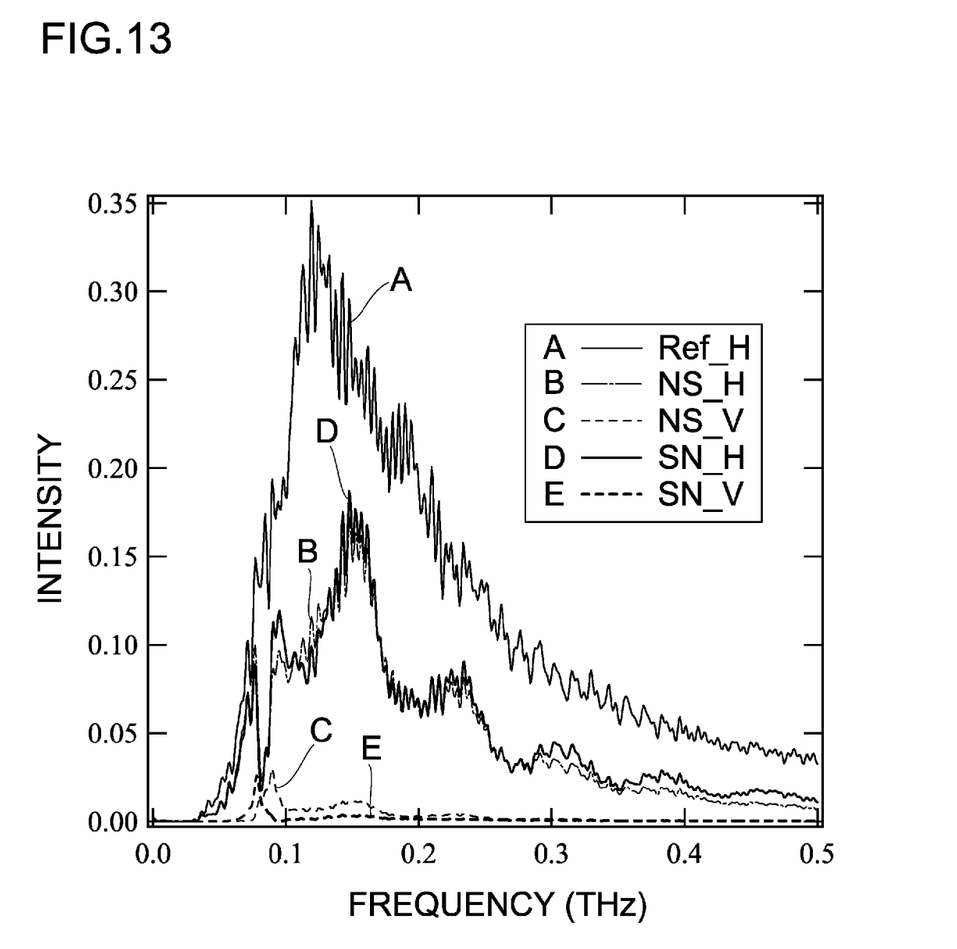
FIG. 13 is a diagram showing Fourier-transform spectra of transmitted waves measured in the example of the present invention.
Figure 14:
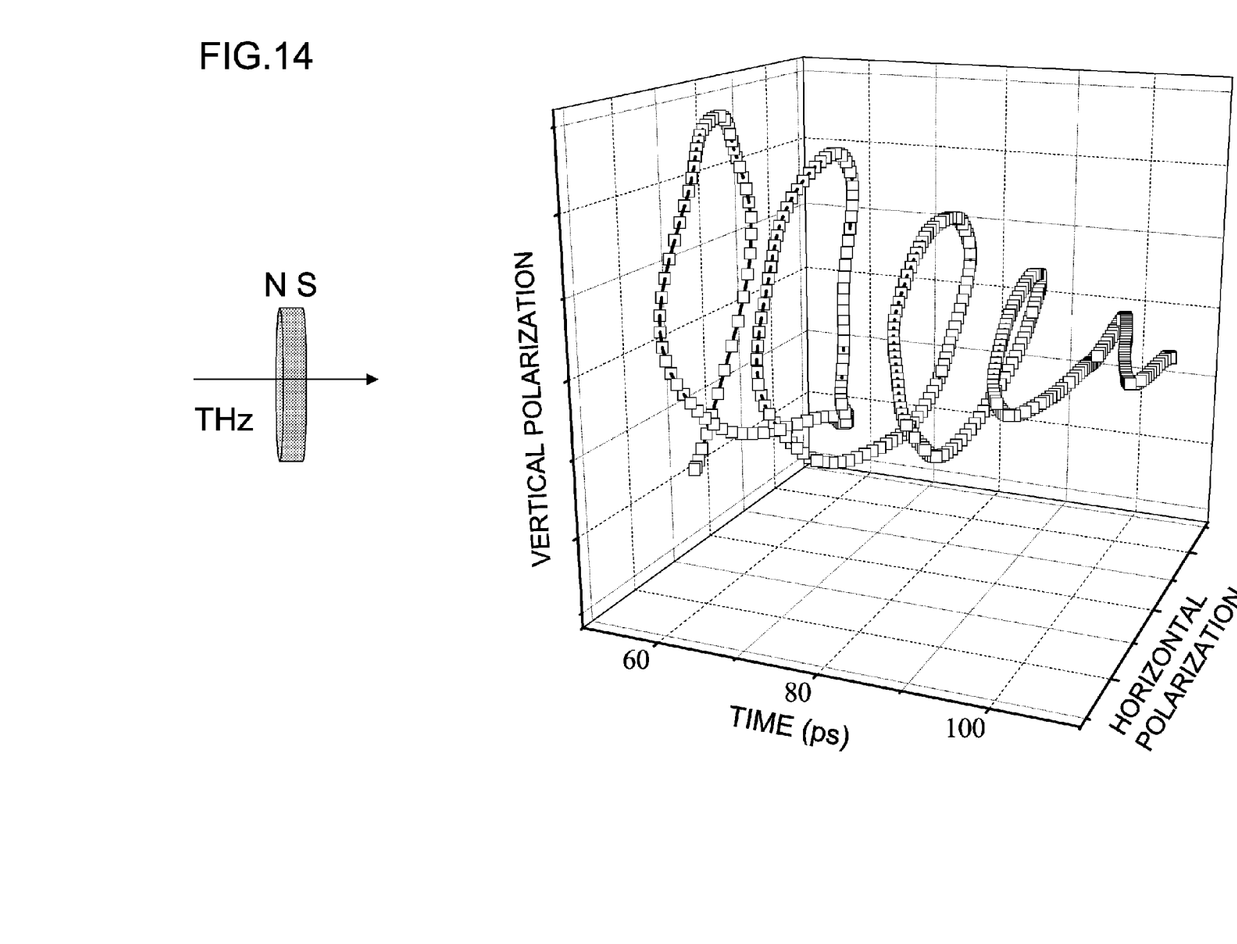
FIG. 14 is a diagram obtained by three dimensionally plotting the transmitted waves measured in the example of the present invention.
Figure 15:
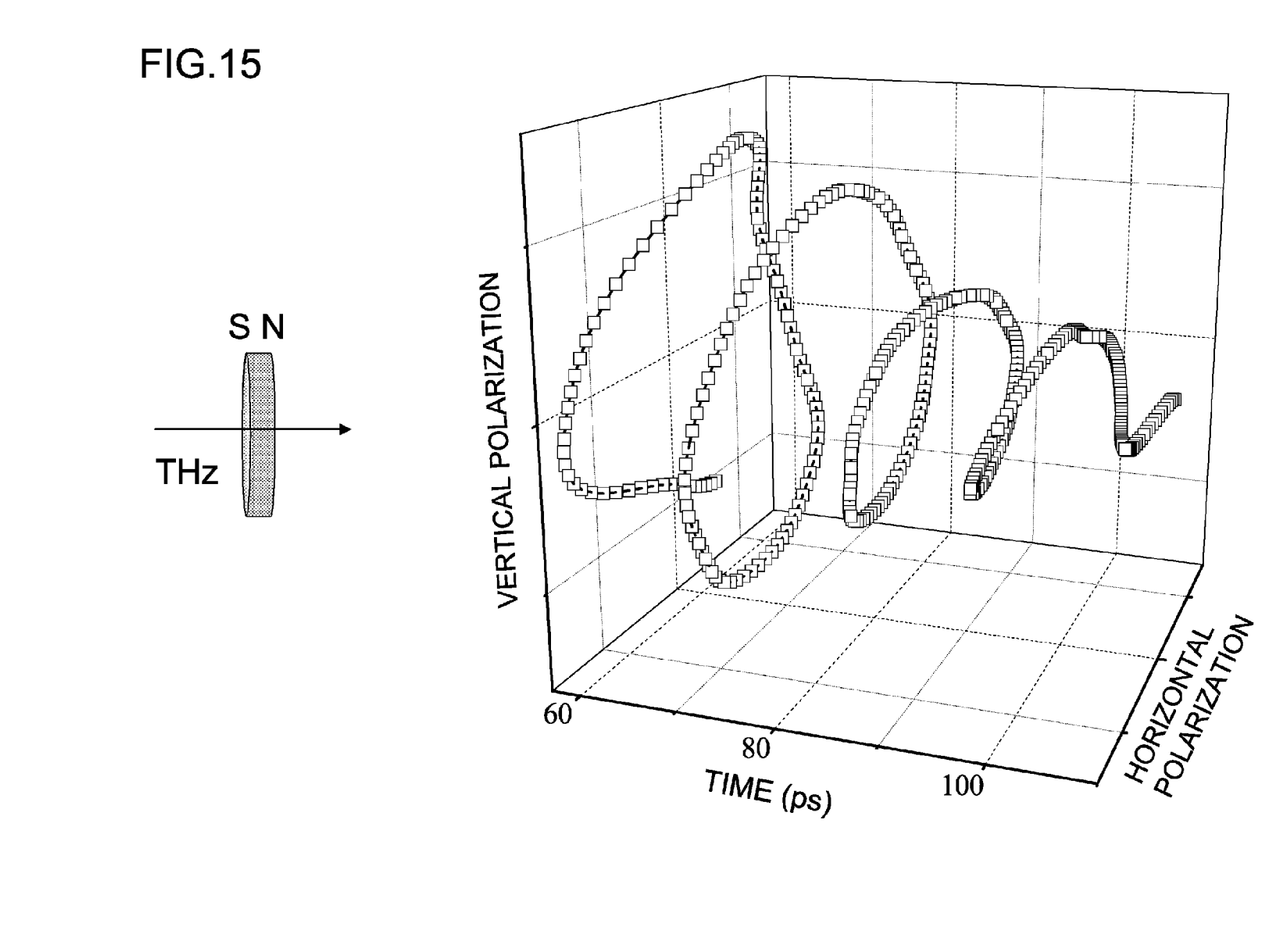
FIG. 15 is also a diagram obtained by three dimensionally plotting the transmitted waves measured in the example of the present invention.

FIG. 13 shows Fourier-transform spectra obtained by cutting out a time region (50 ps to 140 ps) where oscillation is apparent out of all time regions of the measured transmitted waveform. Moreover, portions other than oscillation component are deleted by data processing. FIGS. 14 and 15 are graphs obtained by plotting the waveform three dimensionally.

In FIG. 13, when compared with the A (Ref-H) spectral with no sample, in both of the case (NS) where the terahertz wave is made to enter from the N pole face of the sample and the case (SN) where the terahertz wave is made to enter from the S pole face of the sample, the intensity of the horizontally polarized waves (NS-H and SN-H) is lowered. Further, in both the cases, the vertically polarized waves (NS-V and SN-V) not having entered are observed, which shows that the linearly polarized waves are made to be rotated (that is, the Faraday effect has appeared).

It is understood from FIGS. 14 and 15 that, in the case of the NS sample, counterclockwise polarized portions of the terahertz wave are observed while passing through the sample and residual clockwise polarized waves are observed. Here, the clockwise direction denotes the direction in which a right screw traveling in the traveling direction of the terahertz wave rotates. Similarly, it is thought that, in the case of the SN sample, clockwise polarized waves of the terahertz wave are observed while passing through the sample and residual counterclockwise polarized waves are observed.

The above example has confirmed that the millimeter-wave band nonreciprocal device uses the magnetic material magnetized in advance by external magnetization and, in the magnetic material, the Faraday effect appeared where the linearly polarized wave was made to rotate only by residual magnetization. Therefore, it can be easily predicted that a central frequency can be adjusted by applying external magnetization using a permanent magnet.

It is apparent that the present invention is not limited to the above embodiments but may be changed and modified without departing from the scope and spirit of the invention. For example, in the above example of the present invention, the millimeter-wave band nonreciprocal device can be realized by magnetization of the magnetic material without using the permanent magnet. However, the present invention is not limited to this. The permanent magnet may be applied to the millimeter-wave device.

Industrial Applicability

As it is apparent from the above description, by applying the magnetic material using the orientated ε-phase hematite to the nonreciprocal device, a small-sized millimeter device that can operate in the frequency band of 30 GHz to 300 GHz can be provided.

Explanation of Numerals and Symbols

1: Millimeter-wave band signal source, 2: Millimeter-wave signal detector, 3a: Transmitting horn antenna, 3b: Receiving horn antenna, 4: Sample container securing base, 5: Sample container, 6: Power sample, 7a: Lower punch, 7b: Upper punch, 8a: Lower solenoid coil, 8b: Upper solenoid coil, 9: Dies, 10: Sample, 11: Nanoparticle, 12: Binder, 13: Composite magnetic substance: 14a: Inputting horn antenna, 14b: Outputting horn antenna, 15a: Polarizer, 15b: Analyzer, 16a: Composite magnetic substance, 17: Rectangular wave guide, 18a: Composite magnetic substance, 18b: Composite magnetic substance, 20: Three-branched rectangular wave guide

The invention claimed is:

1. A millimeter-wave band nonreciprocal device comprising:
a waveguide enclosing a magnetic material;
wherein the magnetic material represented by a formula ε-$M_xFe_{2-x}O_3$ (0<x<2), wherein M is at least one of elements In, Ga, Al, Sc, Cr, Sm, Yb, Ce, Ru, Rh, Ti, Co, Ni, Mn, Zn, Zr, and Y.

2. The millimeter-wave band nonreciprocal device according to claim 1, wherein a magnetization easy axis of said magnetic material is oriented in one direction.

3. The millimeter-wave band nonreciprocal device according to claim 1, wherein said magnetic material comprises particles and a magnetization easy axis of each of said particles is orientated in one direction.

4. The millimeter-wave band nonreciprocal device comprising:
any one of a Faraday rotation type isolator, wave-guide type resonance absorption isolator wave uide t Y unction circulator wave- uide type field-displacement isolator strip-line type three branched circulator, and strip-line type edge-guide mode isolator, enclosing a magnetic material,
wherein the magnetic material is represented by a formula ε-$M_xFe_{2-x}O_3$ (0<x<2), wherein M is at least one of elements In, Ga, Al, Sc, Cr, Sm, Yb, Ce, Ru, Rh, Ti, Co, Ni, Mn, Zn, Zr, and Y.

5. The millimeter-wave band nonreciprocal device according to claim 4, wherein a magnetization easy axis of said magnetic material is oriented in one direction.

6. The millimeter-wave band nonreciprocal device according to claim 4, wherein said magnetic material comprises particles and a magnetization easy axis of each of said particles is orientated in one direction, 7. A millimeter-wave band nonreciprocal device comprising:
  at least two polarizers; and
  a magnetic material disposed between the polarizers;
  wherein the magnetic material is represented by a formula $\epsilon\text{-M}_x\text{Fe}_{2-x}\text{O}_3$ ($0<x<2$), wherein M is at least one of elements In, Ga, Al, Sc, Cr, Sm, Yb, Ce, Ru, Rh, Ti, Co, Ni, Mn, Zn, Zr, and Y.

8. The millimeter-wave band nonreciprocal device according to claim 7, wherein a magnetization easy axis of said magnetic material is oriented in one direction.

9. The millimeter-wave band nonreciprocal device according to claim 7, wherein said magnetic material comprises particles and a magnetization easy axis of each of said particles is orientated in one direction.

* * * * *